United States Patent
Agarwal et al.

(10) Patent No.: US 12,250,145 B2
(45) Date of Patent: Mar. 11, 2025

(54) NETWORK-ON-CHIP TOPOLOGY GENERATION

(71) Applicant: Arm Limited, Cambridge (GB)

(72) Inventors: Nitin Kumar Agarwal, Bangalore (IN); Anup Gangwar, Austin, TX (US); Honnahuggi Harinath Venkata Naga Ambica Prasad, Bangalore (IN); Ravishankar Sreedharan, Bangalore (IN); Narayana Sri Harsha Gade, Bangalore (IN)

(73) Assignee: Arm Limited, Cambridge (GB)

( * ) Notice: Subject to any disclaimer, the term of this patent is extended or adjusted under 35 U.S.C. 154(b) by 542 days.

(21) Appl. No.: 17/695,947

(22) Filed: Mar. 16, 2022

(65) Prior Publication Data

US 2022/0210056 A1    Jun. 30, 2022

Related U.S. Application Data

(63) Continuation-in-part of application No. 17/094,145, filed on Nov. 10, 2020, now Pat. No. 11,283,729, which is a continuation-in-part of application No. 17/076,403, filed on Oct. 21, 2020, now Pat. No. 11,194,950, which is a continuation-in-part of application No. 16/518,254, filed on Jul. 22, 2019, now Pat. No. 10,817,627.

(51) Int. Cl.
*H04L 45/00*    (2022.01)
*H04L 45/02*    (2022.01)
*H04L 45/24*    (2022.01)
*H04L 45/42*    (2022.01)

(52) U.S. Cl.
CPC .............. *H04L 45/38* (2013.01); *H04L 45/02* (2013.01); *H04L 45/24* (2013.01); *H04L 45/42* (2013.01)

(58) Field of Classification Search
CPC .... H04L 49/109; H04L 41/0803; H04L 45/02
USPC ........................................................ 716/138
See application file for complete search history.

(56) References Cited

U.S. PATENT DOCUMENTS

| | | | | |
|---|---|---|---|---|
| 10,042,404 | B2* | 8/2018 | Gangwar | G06F 1/3296 |
| 10,218,580 | B2* | 2/2019 | Chopra | H04L 41/145 |
| 10,318,243 | B2* | 6/2019 | Gangwar | H04L 49/40 |
| 10,484,267 | B2* | 11/2019 | Gerstel | H04L 41/40 |
| 10,817,627 | B1* | 10/2020 | Agarwal | G06F 30/18 |
| 11,050,672 | B2* | 6/2021 | Prasad | H04L 12/4625 |

(Continued)

*Primary Examiner* — Jack Chiang
*Assistant Examiner* — Suchin Parihar
(74) *Attorney, Agent, or Firm* — Leveque Intellectual Property Law, P.C.

(57) ABSTRACT

A computer-based method and system for synthesizing a Network-on-Chip (NoC) is provided. One method includes determining physical data, device data, bridge data, traffic data and domain data based on an input specification for the NoC; assigning a domain to each bridge port; partitioning each traffic flow into one of a plurality of bins based on the bridge port domain assignments and the domain crossing constraints; creating a virtual node at each bridge port endpoint; generating a candidate topology for each bin based on the physical data, the device data, the bridge data, the traffic data, the domain data and the virtual nodes, each candidate topology including bridge ports, a tree of routers, routes and connections; and generating a final topology by merging the candidate topologies.

20 Claims, 14 Drawing Sheets

(56) References Cited

U.S. PATENT DOCUMENTS

| | | | |
|---|---|---|---|
| 2010/0161793 A1* | 6/2010 | Young Hwan | G06F 15/16 |
| | | | 709/224 |
| 2014/0376569 A1* | 12/2014 | Philip | G06F 1/12 |
| | | | 370/503 |
| 2015/0109024 A1* | 4/2015 | Abdelfattah | H03K 19/017581 |
| | | | 326/41 |
| 2018/0227180 A1* | 8/2018 | Rao | G06F 30/392 |
| 2019/0205493 A1* | 7/2019 | Garibay | G06F 30/398 |
| 2021/0029045 A1* | 1/2021 | Prasad | H04L 12/4625 |
| 2021/0036959 A1* | 2/2021 | Cheng | H04L 43/0894 |
| 2021/0160194 A1* | 5/2021 | Prasad | H04L 41/5022 |

* cited by examiner

NETWORK-ON-CHIP TOPOLOGY GENERATION

CROSS-REFERENCE TO RELATED APPLICATIONS

This application is a continuation-in-part (CIP) of U.S. patent application Ser. No. 17/094,145 (filed on Nov. 10, 2020), which is a CIP of U.S. patent application Ser. No. 17/076,403 (filed on Oct. 21, 2020; now U.S. Pat. No. 11,194,950), which is a CIP of U.S. patent application Ser. No. 16/518,254 (filed on Jul. 22, 2019; now U.S. Pat. No. 10,817,627), the disclosures of which are incorporated herein by reference in their entireties.

BACKGROUND

The present disclosure relates to a network. More particularly, the present disclosure relates to a Network-on-Chip (NoC).

A NoC is a network-based communication subsystem implemented on an integrated circuit (IC), such as a System-on-Chip (SoC), that enables IC modules to exchange data more effectively than conventional bus or crossbar architectures. More particularly, a NoC is a router-based packet switching network that connects IC modules, such as intellectual property (IP) cores. A NoC includes various components, such as routers, power clock domain crossing (PCDC) buffers, resizers or serializers/deserializers (SerDes's), pipeline elements, etc. NoC synthesis is a process that lays out and configures NoC components on the IC based on a NoC input specification. Generally, the NoC design must accommodate the data or traffic communicated between IC modules while satisfying various design constraints, such as power, performance and area (PPA), wiring cost, timing, etc., that may conflict with one another.

NoC synthesis includes, inter alia, generating the topology for the NoC, which is the general arrangement of routers, connections, and traffic paths or routes between IC modules, while honoring certain design constraints. A poorly-designed NoC can significantly impact the NoC's PPA, wiring cost, etc., and may fail to meet the SoC's timing and area specifications due to excessive domain crossings.

DETAILED DESCRIPTION

Figure 1:
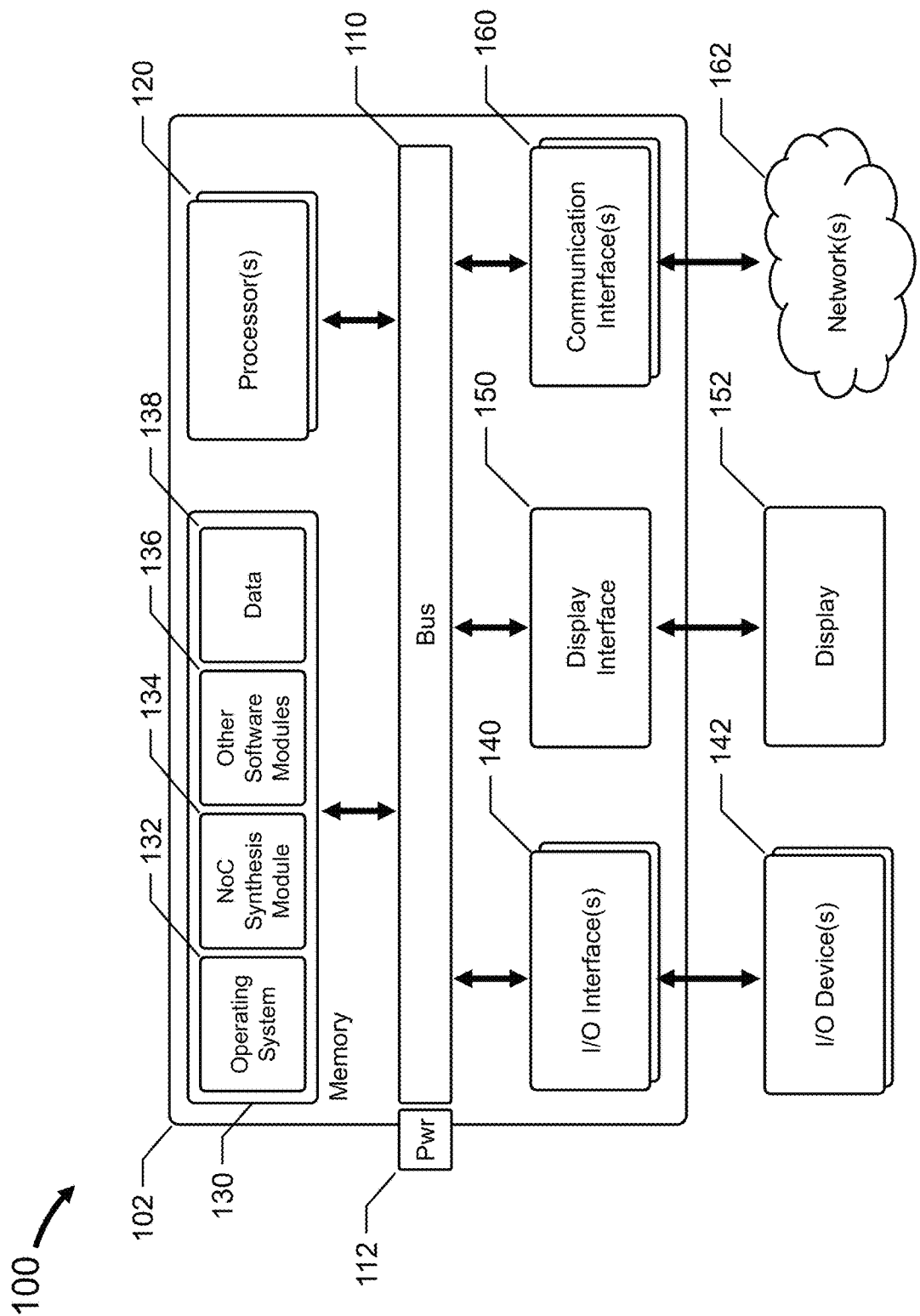
FIG. 1 depicts a block diagram of a NoC synthesis system, in accordance with an embodiment of the present disclosure.

Embodiments of the present disclosure will now be described with reference to the drawing figures, in which like reference numerals refer to like parts throughout.

Embodiments of the present disclosure advantageously provide a computer-based method and system for synthesizing a NoC. More particularly, embodiments of the present disclosure advantageously honor domain constraints, such as, for example, the total number of domain transitions for the traffic flows in the NoC, while optimizing the NoC topology for other PPA cost objectives.

In one embodiment, a computer-based method for generating a Network-on-Chip (NoC) topology includes determining physical data, device data, bridge data, traffic data and domain data based on an input specification for the NoC; assigning a domain to each bridge port; partitioning each traffic flow into one of a plurality of bins based on the bridge port domain assignments and the domain crossing constraints; creating a virtual node at each bridge port endpoint; generating a candidate topology for each bin based on the physical data, the device data, the bridge data, the traffic data, the domain data and the virtual nodes, each candidate topology including bridge ports, a tree of routers, routes and connections; and generating a final topology by merging the candidate topologies. The physical data include dimensions for the NoC, the device data include a plurality of devices, each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints.

FIG. 1 depicts a block diagram of NoC synthesis system 100, in accordance with an embodiment of the present disclosure.

Generally, computer 102 includes, inter alia, bus 110 coupled to one or more processors 120, one or more storage elements or memories 130, one or more input/output (I/O) interfaces 140, display interface 150, and one or more communication interfaces 160. I/O interface(s) 140 are coupled to I/O device(s) 142 using wired or wireless connections, display interface 150 is coupled to display 152 using a wired or wireless connection, and communication interface(s) 160 are coupled to network(s) 162 using wired or wireless connections.

Bus 110 is a communication system that transfers data between processor 120, memory 130, I/O interface 140, display interface 150, and communication interface 160, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100, such as, for example, a central processing unit (CPU), a graphical processing unit (GPU), etc. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, NoC synthesis module 134, other software modules 136, etc., stored within memory 130.

Generally, memory 130 stores instructions for execution by processor 120 and data 138. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data 138. For example, memory 130 stores software modules that provide functionality when executed by processor 120. The software modules include operating system 132 that provides operating system functionality for computer 100. The software modules also include NoC synthesis module 134 that provides functionality for synthesizing the NoC architecture. In certain embodiments, NoC synthesis module 134 may include a plurality of modules, each module providing specific individual functionality for synthesizing the NoC architecture, such as, for example, an input module, a VC module, a topology module, a routing module, a network generation module, a PCDC module, a link size and resizer module, a relocation, pipeline and timing module, an output module, etc. Other software modules 136 may cooperate with NoC synthesis module 134 to provide functionality for synthesizing the NoC architecture.

Data 138 may include data associated with operating system 132, NoC synthesis module 134, other software modules 136, etc.

I/O interface(s) 140 are configured to transmit and/or receive data from I/O device(s) 142. I/O interface(s) 140 enable connectivity between processor 120 and I/O device(s) 142 by encoding data to be sent from processor 120 to I/O device(s) 142, and decoding data received from I/O device(s) 142 for processor 120. Generally, data may be sent over wired and/or wireless connections. For example, I/O interface(s) 140 may include one or more wired communications interfaces, such as USB, Ethernet, etc., and/or one or more wireless communications interfaces, coupled to one or more antennas, such as WiFi, Bluetooth, cellular, etc.

Generally, I/O device(s) 142 provide input to computer 102 and/or output from computer 102. As discussed above, I/O device(s) 142 are operably connected to computer 102 using a wired and/or wireless connection. I/O device(s) 142 may include a local processor coupled to a communication interface that is configured to communicate with computer 102 using the wired and/or wireless connection. For example, I/O device(s) 142 may include a keyboard, mouse, touch pad, joystick, etc.

Display interface 150 is configured to transmit image data from computer 102 to monitor or display 152.

Communication interface(s) 160 are configured to transmit data to and from network(s) 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 2:
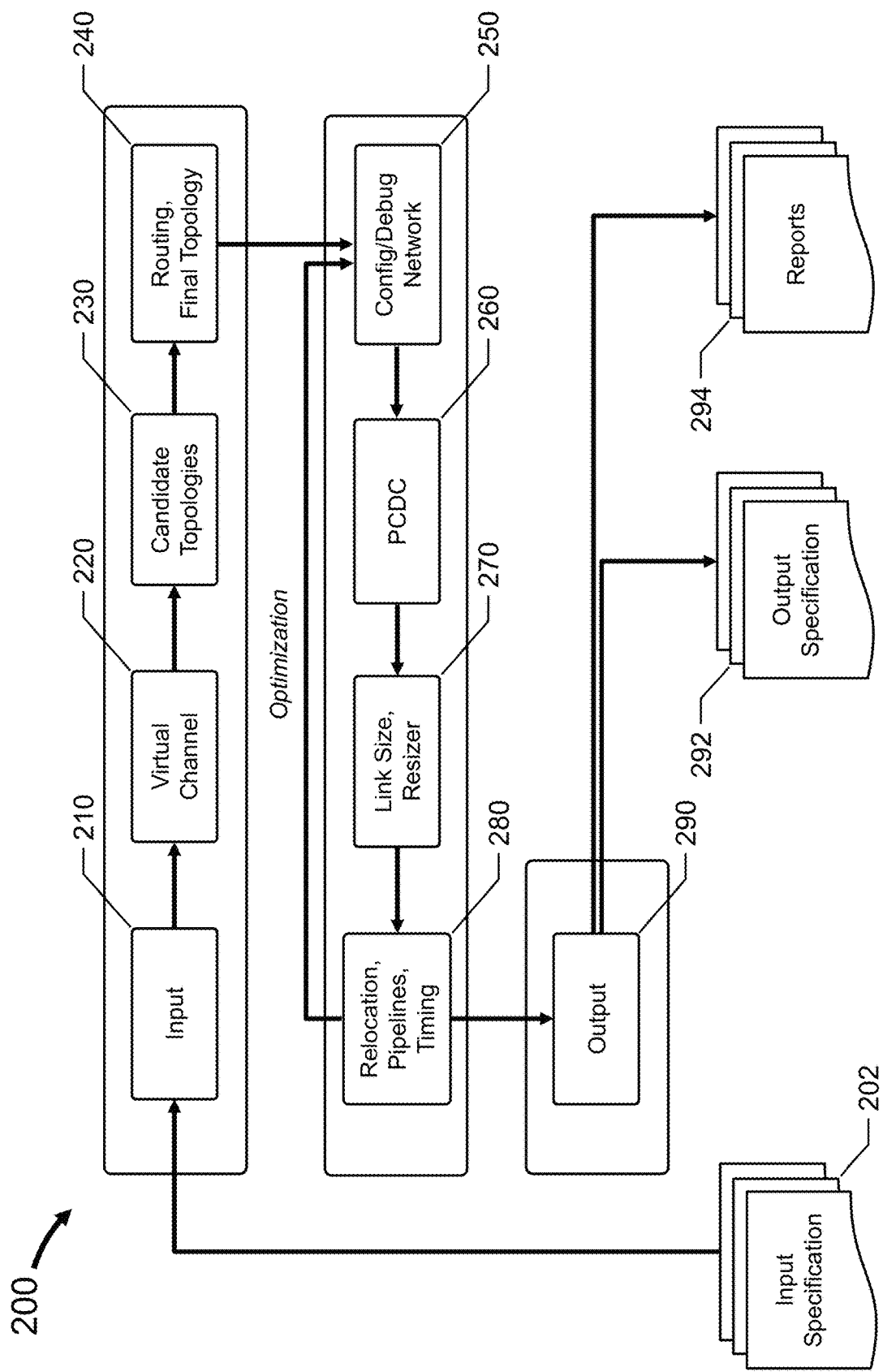
FIG. 2 depicts a NoC synthesis flow diagram, in accordance with an embodiment of the present disclosure.

FIG. 2 depicts NoC synthesis flow diagram 200, in accordance with an embodiment of the present disclosure.

As discussed above, the software modules include NoC synthesis module 134 that provides functionality for synthesizing the NoC architecture. In certain embodiments, NoC synthesis module 134 includes a plurality of modules, each module providing specific individual functionality for synthesizing the NoC architecture, such as, for example, an input module, a VC assignment module, a topology module, a routing module, a network generation module, a PCDC module, a link size and resizer module, a relocation, pipeline and timing component module, an output module, etc.

At 210, NoC input specification 202 is retrieved from memory 130 and design information for the NoC is determined. For example, NoC input specification 202 may be received over network 162 and then stored as data 138 in memory 130. In another example, NoC input specification 202 may be created by a NoC designer using one or more software modules 136, and then stored as data 138 in memory 130.

Design data for the NoC includes, for example, physical data, device data, bridge data, traffic data, domain data, etc. The domain data may include voltage domain data, power domain data, clock domain data, address region data, synthesis constraints, etc.

Physical data include the dimensions for the NoC and a list of unrouteable areas. NoC components, such as bridges, routers, PCDC buffers, resizers, pipelines, connections, etc., are not typically located within unrouteable areas. In one example, the NoC is modeled as an array of cells arranged in rows and columns. The number of rows is defined by a height (in cells), and the number of columns is defined by a width (in cells). A cell width, in millimeters, micrometers, inches, etc., may also be provided. The cells are numbered sequentially, starting in the upper left corner of the array. Data for each unrouteable area include a location (cell number) and dimensions, such as a width (in cells) and a height (in cells). In another example, the NoC is modeled as a grid defined by cartesian coordinates (X, Y), with the origin located in the lower left corner of the grid. The height and the width are provided in normalized units, and a normalization factor may also be provided. Data for each unrouteable area include a location (X,Y) and dimensions, such as a width (X) and a height (Y).

Device data include a list of devices, such as IP cores, IC modules, etc., located within the NoC. Each device includes one or more bridges with one or more bridge ports (i.e., signal interfaces). Data for each device may include a name, a location (cell number, X-Y coordinates, etc.), dimensions including a width (in cells, X dimension, etc.) and a height (in cells, Y dimension, etc.), a power domain, etc.

Bridge data include a list of bridge ports for the devices. Data for each bridge port may include a name, an associated device name, a location (cell number, X-Y coordinates, etc.), a data width (in bits), a low/high wire indicator, etc.

In many embodiments, the NoC is a packet-switched network that divides data packets into a sequence of message flow control units or flits. Each flit has the same size (in bits), and is divided into a sequence of data transfers across a physical connection or link. A physical unit, or phit, is the number of bits that can be transferred in parallel in a single data transfer cycle across the physical connection, i.e., the bitwidth of the link. In one example, the flit size for a link is 128 bits. A bridge port having a data width (phit size) of 32 bits needs 4 data transfer cycles to transfer each flit. In the context of the present disclosure, the link size for this bridge port is 4 (each unit of link size is 32 bits). Similarly, a bridge port having a data width of 16 bits needs 8 data transfer cycles to transfer each flit and has a link size of 8 (each unit of link size is 16 bits), while a bridge port having a data width of 64 bits needs 2 data transfer cycles to transfer each flit and has a link size of 2 (each unit of link size is 64 bits). Other flit sizes, such as, for example, 32 bits, 64 bits, 256 bits, 512 bits, etc. may also be used. Different flow control techniques may be used in alternative embodiments.

Traffic data include a list of traffic flows for the NoC. Data for each traffic flow include a source bridge port, a destination bridge port, a peak traffic rate, an average traffic rate, and a traffic class. The source bridge port and the destination bridge port are included within the list of bridge ports. The peak traffic rate and the average traffic rate are provided in bits or bytes per second, such as, for example, b/s, kb/s, Mb/s, Gb/s, Tb/s, etc., B/s, KB/s, MB/s, GB/s, TB/s, etc. Generally, the traffic class provides one or more metrics that differentiate the level of NoC performance that may be provided for each traffic flow. In many embodiments, the traffic class includes a quality of service (QoS) metric and a latency sensitivity (LS) metric. The QoS metric provides a mechanism to prioritize traffic within the NoC, while the LS metric indicates the sensitivity of the traffic to network delays. For example, for an integer QOS metric with four possible values (e.g., 0 to 3) and a Boolean LS metric with two possible values (e.g., true or false), 8 different traffic classes are provided. In this example, a QoS value of 0 and an LS value of true provides the best potential NoC performance. Other metrics are also contemplated. Additionally, a message type may also be provided, such as, for example, a read request, a write request, a read/write request, etc.

Figure 3A:
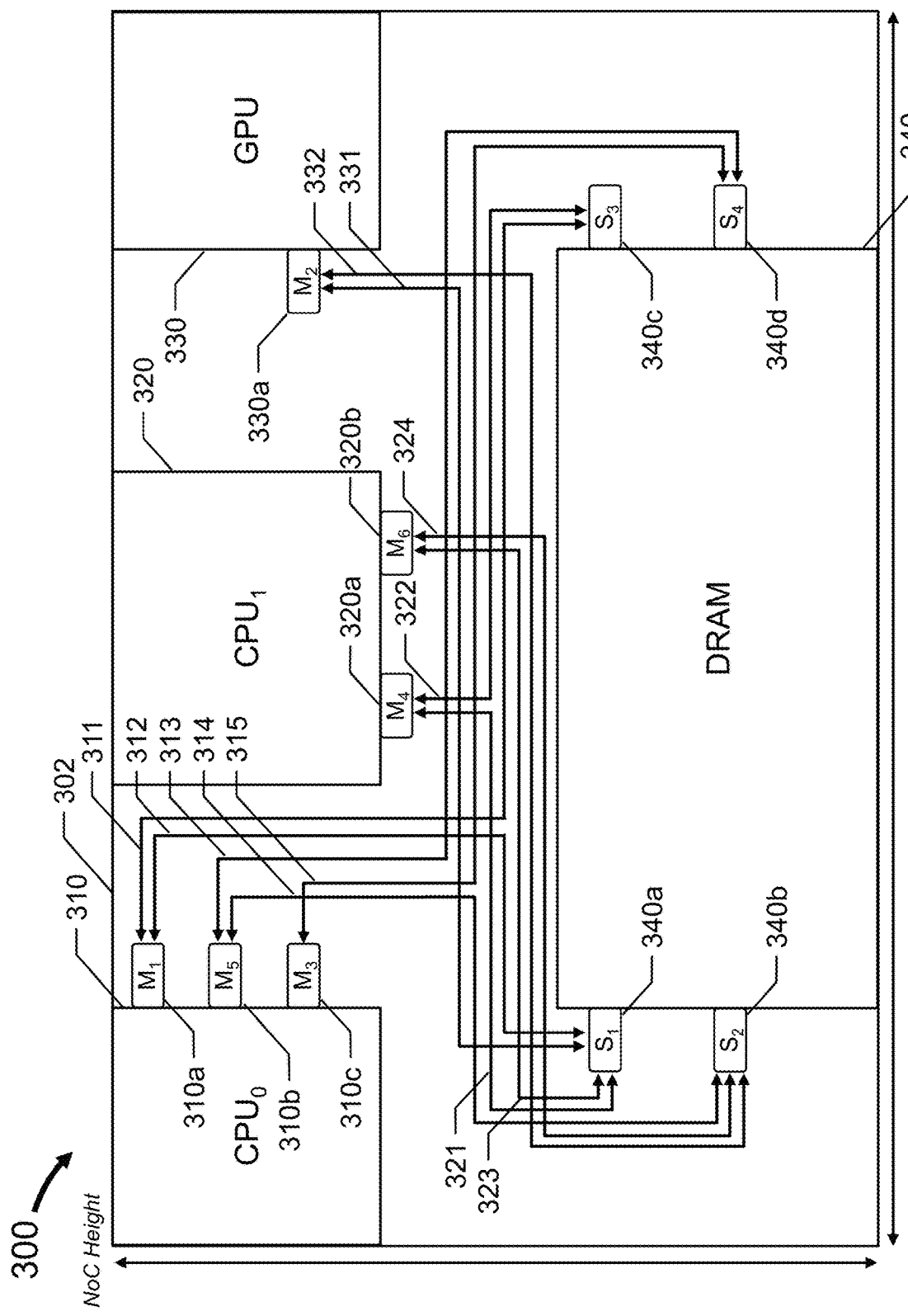
FIGS. 3A and 3B depict a NoC, in accordance with an embodiment of the present disclosure.

FIG. 3A depicts NoC 300, in accordance with an embodiment of the present disclosure.

NoC 300 is a graphical representation of NoC input specification 202, which may be viewed on display 152. NoC 300 has an overall rectangular footprint 302 that may be generally defined by a NoC height and a NoC width. NoC 300 may include several areas that may not be available for NoC element placement, wire routes, etc., such as, for example, device 310, device 320, device 330, device 340, unrouteable areas (not depicted for clarity), etc. For ease of illustration, each device is a master device or a slave device, and has at least one bridge port that is identified as either a master bridge port (i.e., $M_i$) or a slave bridge port (i.e., $S_j$).

Device 310 (e.g., $CPU_0$) is a master device that includes three bridge ports, i.e., bridge port 310a (e.g., $M_1$), bridge port 310b (e.g., $M_5$), and bridge port 310c (e.g., $M_3$). Device 320 (e.g., $CPU_1$) is a master device that includes two bridge ports, i.e., bridge port 320a (e.g., $M_4$), and bridge port 320b (e.g., $M_6$). Device 330 (e.g., GPU) is a master device that includes one bridge port, i.e., bridge port 330a (e.g., $M_2$). Device 340 (e.g., DRAM) is a slave device that includes four bridge ports, i.e., bridge port 340a (e.g., $S_1$), bridge port 340b (e.g., $S_2$), bridge port 340c (e.g., $S_3$), and bridge port 340d (e.g., $S_4$).

Generally, the location of each bridge port is limited by the location of the associated device and the footprint of the device within the NoC, i.e., the device width and height. For example, for an 3 cell×5 cell NoC, a device located at cell number 1 having a width of 1 cell and a height of 1 cell supports one or more bridge ports located at cell numbers 2 and/or 6.

Eleven sets of traffic flows between the devices are depicted; each traffic flow set includes at least one traffic flow. For example, a traffic flow set may include a traffic flow that defines a read request and a traffic flow that defines a write request.

With respect to bridge port 310a ($M_1$), traffic flow set 311 flows between bridge port 310a and bridge port 340c ($S_3$), and traffic flow set 312 flows between bridge port 310a and bridge port 340a ($S_1$). With respect to bridge port 310b ($M_5$), traffic flow set 313 flows between bridge port 310b and bridge port 340d ($S_4$), and traffic flow set 314 flows between bridge port 310b and bridge port 340b ($S_2$). With respect to bridge port 310c ($M_3$), traffic flow set 315 flows between bridge port 310c and bridge port 340d ($S_4$).

With respect to bridge port 320a ($M_4$), traffic flow set 321 flows between bridge port 320a and bridge port 340a ($S_1$), and traffic flow set 322 flows between bridge port 320a and bridge port 340c ($S_3$). With respect to bridge port 310b ($M_6$), traffic flow set 323 flows between bridge port 320b and bridge port 340a ($S_1$), and traffic flow set 324 flows between bridge port 320b and bridge port 340b ($S_2$).

With respect to bridge port 330a ($M_2$), traffic flow set 331 flows between bridge port 320a and bridge port 340a ($S_1$), and traffic flow set 332 flows between bridge port 330a and bridge port 340b ($S_2$).

Figure 3B:
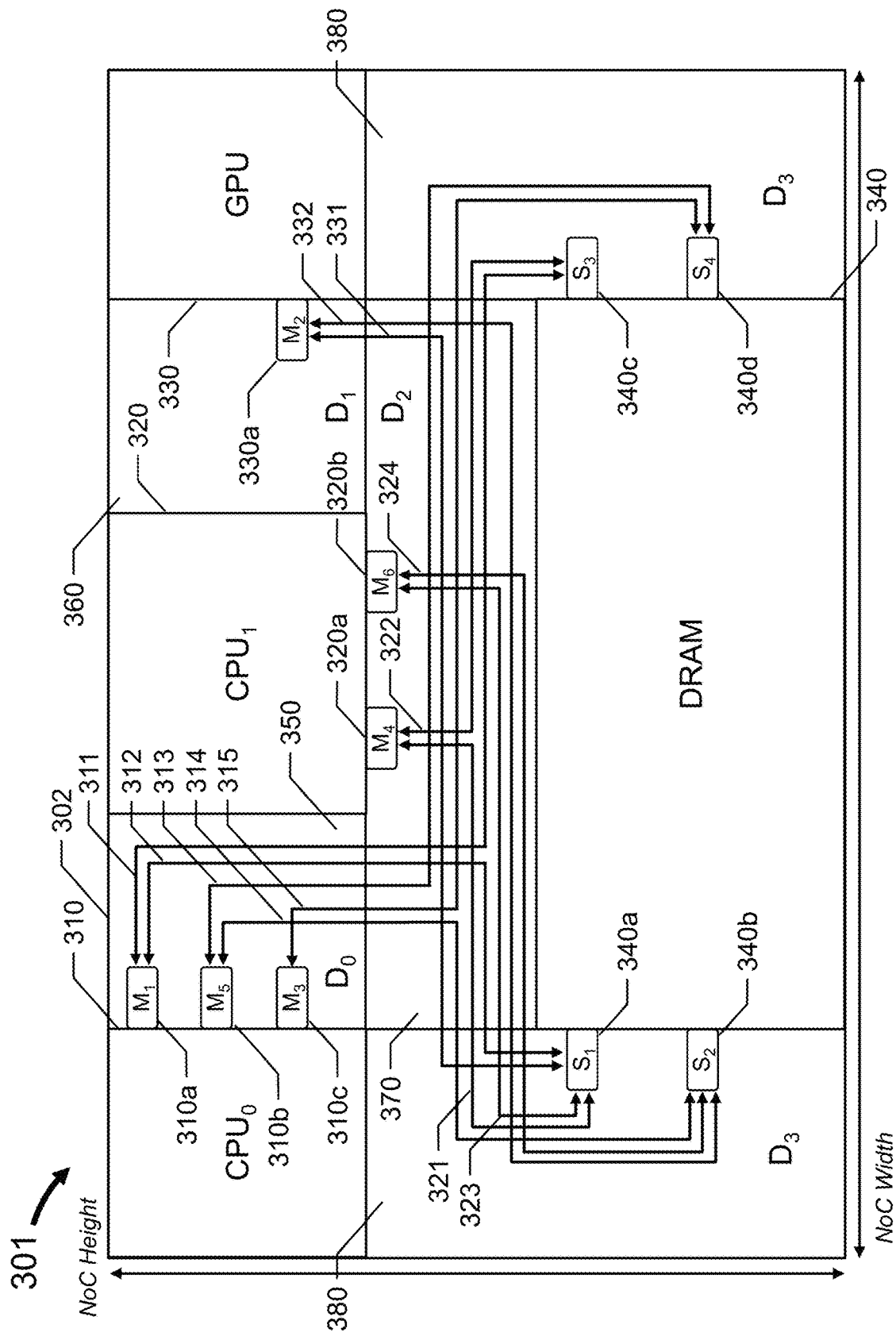

FIG. 3B depicts NoC 301, in accordance with an embodiment of the present disclosure.

Domain 350 ($D_0$), domain 360 ($D_1$), domain 370 ($D_2$), and domain 380 ($D_3$) have been added to NoC 300 depicted in FIG. 3A. Domain 380 ($D_3$) includes two separate regions of NoC 300. These domains may represent voltage domains, power domains, clock domains, etc., as well as a combination of one of more of these domain types, such as, for example, power/clock domains, voltage/power/clock domains, etc. For the purpose of illustration, domains 350, 360, 370 and 380 represent power and clock (PC) domains. Each device bridge port is initially assigned to one of these domains, and, because every domain transition adds a significant PPA cost to the NoC, embodiments of the present disclosure advantageously minimize the total number of domain transitions for the traffic flows in the NoC while optimizing the NoC topology for other PPA cost objectives. Importantly, NoC input specification 202 may include one or more domain crossing constraints, such as, for example, a domain crossing constraint that requires a maximum of 1 domain transition in every traffic route.

In this embodiment, bridge ports 310a, 310b and 310c are assigned to domain 350, bridge ports 320a and 320b are assigned to domain 370, bridge port 330a is assigned to domain 360, and bridge ports 340a, 340b, 340c and 340d are assigned to domain 380. Other domain assignments are also contemplated.

Figure 4:
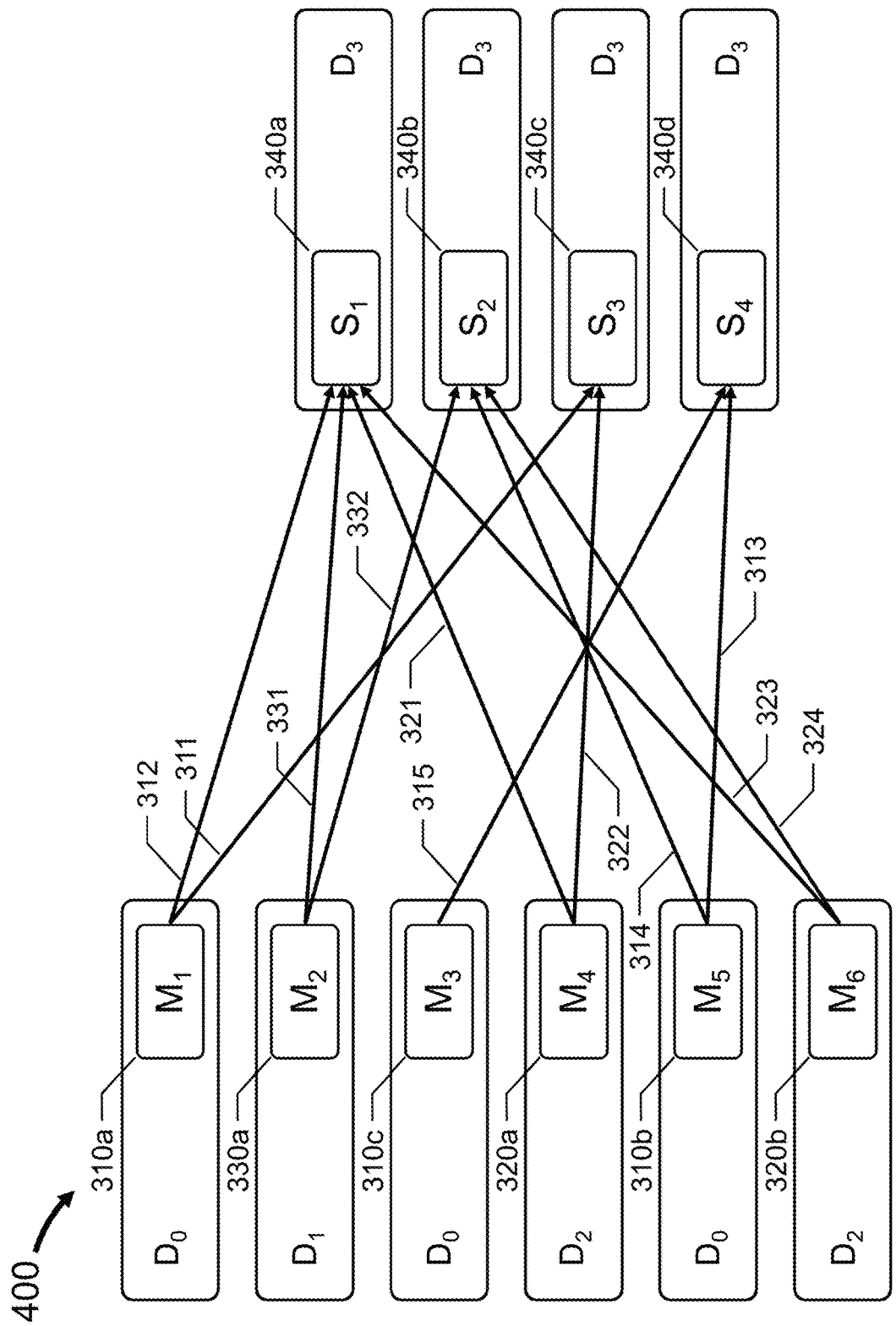
FIG. 4 presents a traffic flow logical diagram for a NoC, in accordance with an embodiment of the present disclosure.

FIG. 4 presents a traffic flow logical diagram 400 for NoC 300, in accordance with an embodiment of the present disclosure.

As noted above, bridge ports 310a ($M_1$), 310b ($M_5$) and 310c ($M_3$) are assigned to domain $D_0$, bridge port 330a ($M_2$) is assigned to domain $D_0$, bridge ports 320a ($M_4$) and 320c b ($M_6$) are assigned to domain $D_2$, and bridge ports 340a ($S_1$), 340b ($S_2$), 340c ($S_3$) and 340d ($S_4$) are assigned to domain $D_3$.

Generally, traffic flow sets 311, 312, 313, 314 and 315 flow between domain $D_0$ and domain $D_3$. More particularly, traffic flow set 311 flows between bridge port 310a ($M_1$) in domain $D_0$ and bridge port 340a ($S_1$) in domain $D_3$. Traffic flow set 312 flows between bridge port 310a ($M_1$) in domain $D_0$ and bridge port 340c ($S_3$) in domain $D_3$. Traffic flow set 313 flows between bridge port 310b ($M_5$) in domain $D_0$ and bridge port 340d ($S_4$) in domain $D_3$. Traffic flow set 314 flows between bridge port 310b ($M_5$) in domain $D_0$ and bridge port 340b ($S_2$) in domain $D_3$. Traffic flow set 315 flows between bridge port 310c ($M_3$) in domain $D_0$ and bridge port 340d ($S_4$) in domain $D_3$.

Generally, traffic flow sets 331 and 332 flow between domain $D_1$ and domain $D_3$. More particularly, traffic flow set 331 flows between bridge port 330a ($M_2$) in domain $D_1$ and bridge port 340a ($S_1$) in domain $D_3$. Traffic flow set 332 flows between bridge port 330a ($M_2$) in domain $D_1$ and bridge port 340b ($S_2$) in domain $D_3$.

Generally, traffic flow sets 321, 322, 323 and 324 flow between domain $D_2$ and domain $D_3$. More particularly, traffic flow set 321 flows between bridge port 320a ($M_4$) in domain $D_2$ and bridge port 340a ($S_1$) in domain $D_3$. Traffic flow set 322 flows between bridge port 320a ($M_4$) in domain $D_2$ and bridge port 340c ($S_3$) in domain $D_3$. Traffic flow set 323 flows between bridge port 320b ($M_6$) in domain $D_2$ and bridge port 340a ($S_1$) in domain $D_3$. Traffic flow set 324 flows between bridge port 320b ($M_6$) in domain $D_2$ and bridge port 340b ($S_2$) in domain $D_3$.

Referring back to FIG. 2, at 220, a VC is assigned to each traffic flow. Generally, VCs are assigned to reduce conflicts and simplify the subsequent topology generation. In one embodiment, the VCs are assigned using an iterative estimation process that performs a specify-evaluate-refine loop until no significant improvement in the estimations are generated. Other assignment methodologies are also contemplated.

At 230, candidate topologies for the NoC are determined.

The traffic flows are first partitioned into bins based on the domain assignments for each bridge port and the domain crossing constraint(s) provided in NoC input specification 202. Each bin represents a domain crossing constraint color. For the purpose of illustration, in one embodiment, NoC input specification 202 includes a domain crossing constraint that requires a maximum of 1 domain transition in every traffic route.

For this embodiment, a first bin and color (e.g., red) represents traffic flows that cross between a first domain (e.g., Do) and a fourth domain (e.g., $D_3$), a second bin and color (e.g., green) represents traffic flows that cross between a second domain (e.g., $D_1$) and the fourth domain (e.g., $D_3$), and a third bin and color (e.g., blue) represents traffic flows that cross between a third domain (e.g., $D_2$) and the fourth domain (e.g., $D_3$).

Figure 5A:
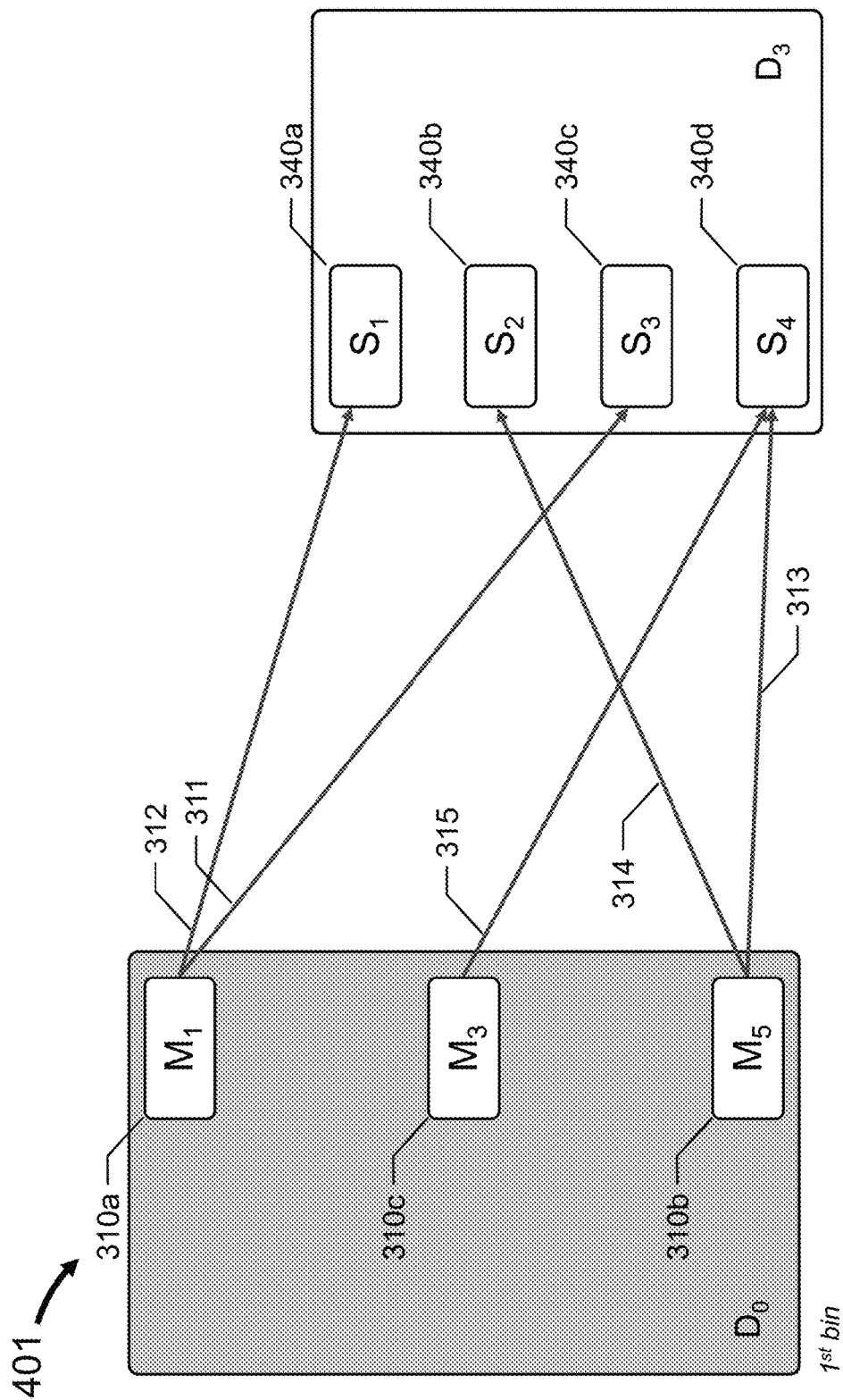
FIGS. 5A, 5B and 5C present traffic flow partitioning diagrams for a NoC, in accordance with an embodiment of the present disclosure.
Figure 5B:
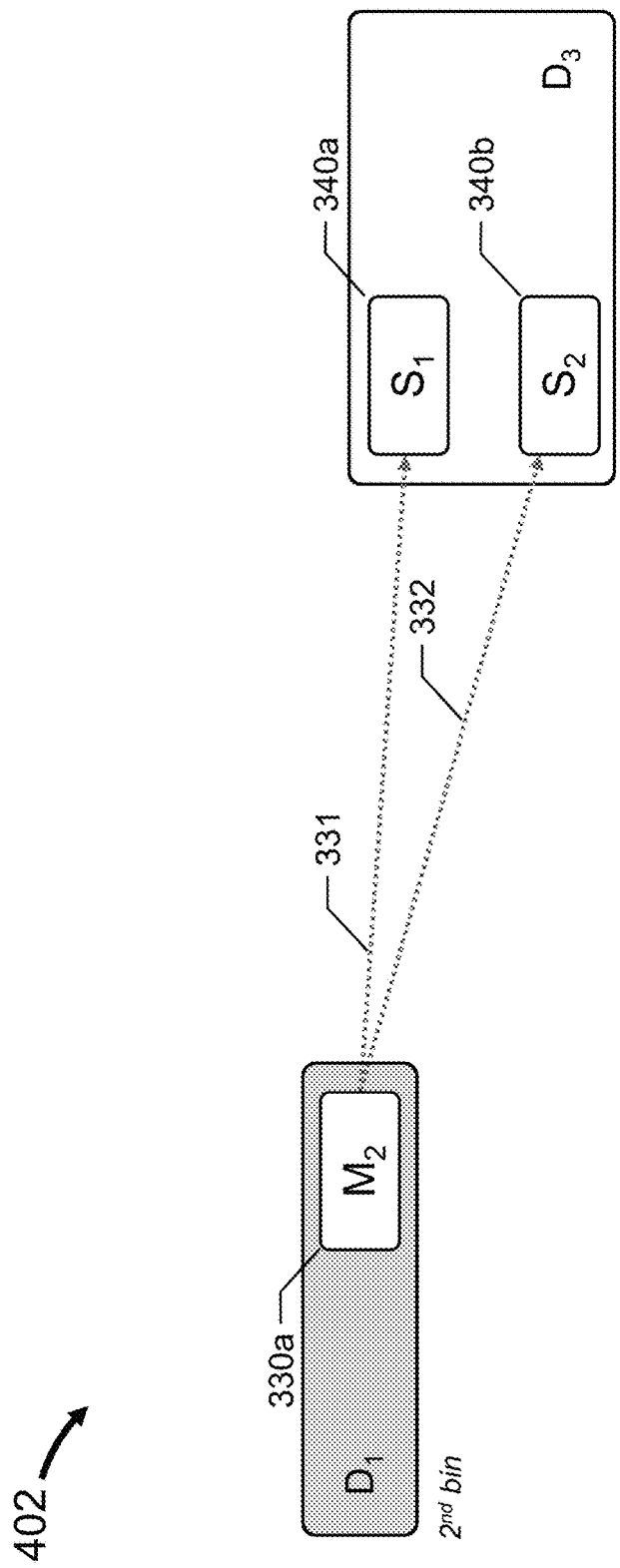
Figure 5C:
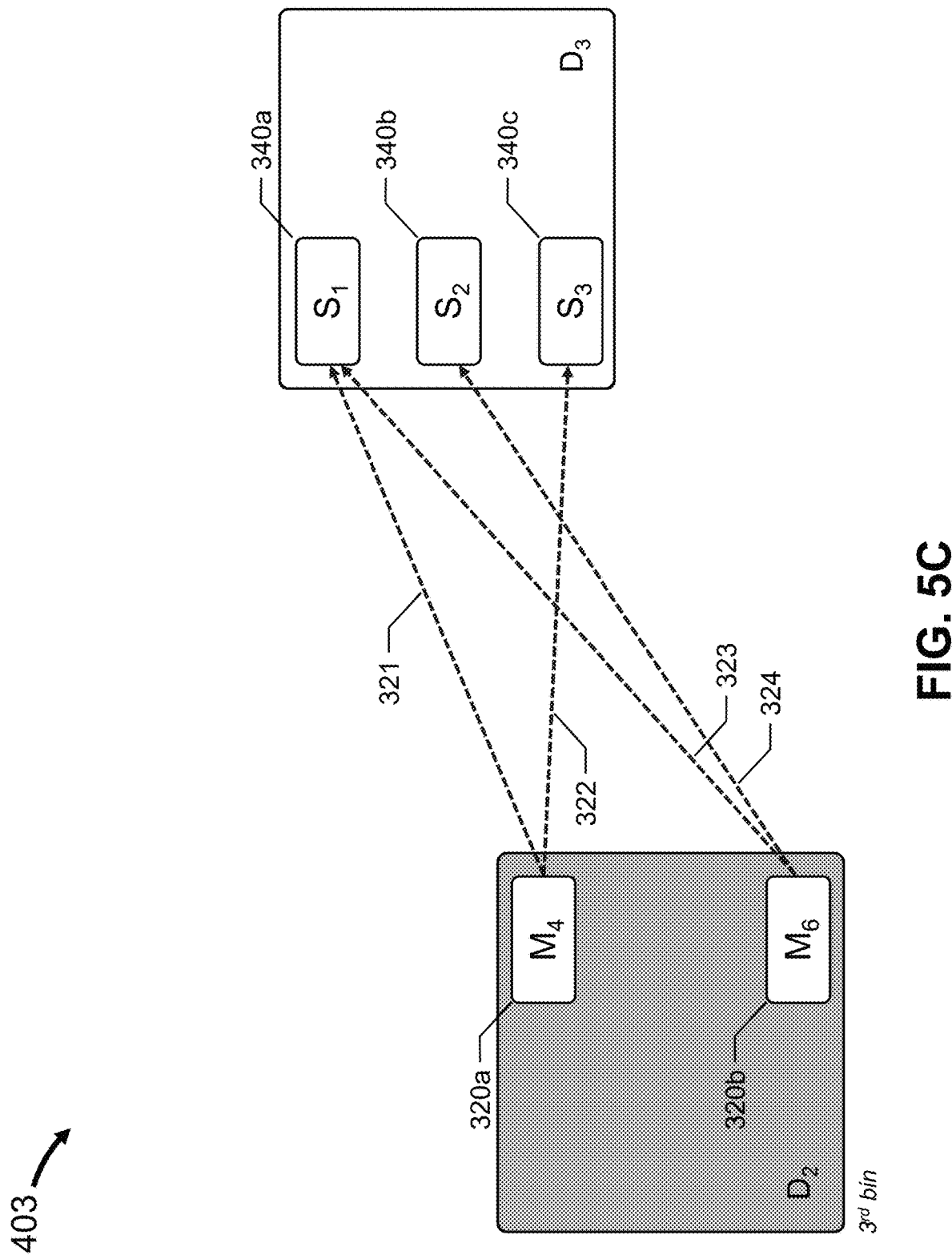

FIGS. 5A, 5B and 5C present traffic flow partitioning diagrams for NoC 300, in accordance with an embodiment of the present disclosure.

FIG. 5A presents traffic flow partitioning diagram 401 for NoC 300, in accordance with an embodiment of the present disclosure. Traffic flow partitioning diagram 401 depicts the assignment of traffic flow sets 311, 312, 313, 314 and 315 to the first bin and color (e.g., red).

FIG. 5B presents traffic flow partitioning diagram 402 for NoC 300, in accordance with an embodiment of the present disclosure. Traffic flow partitioning diagram 402 depicts the assignment of traffic flow sets 331 and 332 to the second bin and color (e.g., green).

FIG. 5C presents traffic flow partitioning diagram 403 for NoC 300, in accordance with an embodiment of the present disclosure. Traffic flow partitioning diagram 401 depicts the assignment of traffic flow sets 321, 322, 323 and 324 to the third bin and color (e.g., blue).

Each traffic flow set has a set or pair of bridge port endpoints. For this embodiment, each master bridge port ($M_i$) includes at least one master network interface (MNI) endpoint, each slave bridge port ($S_j$) includes at least one AXI slave network interface (ASNI) endpoint, and each set of endpoints includes an MNI endpoint and an ASNI endpoint.

A virtual node is then created at every endpoint.

FIGS. 6A, 6B, 6C and 6D present virtual node diagrams for NoC 300, in accordance with an embodiment of the present disclosure.

Figure 6A:
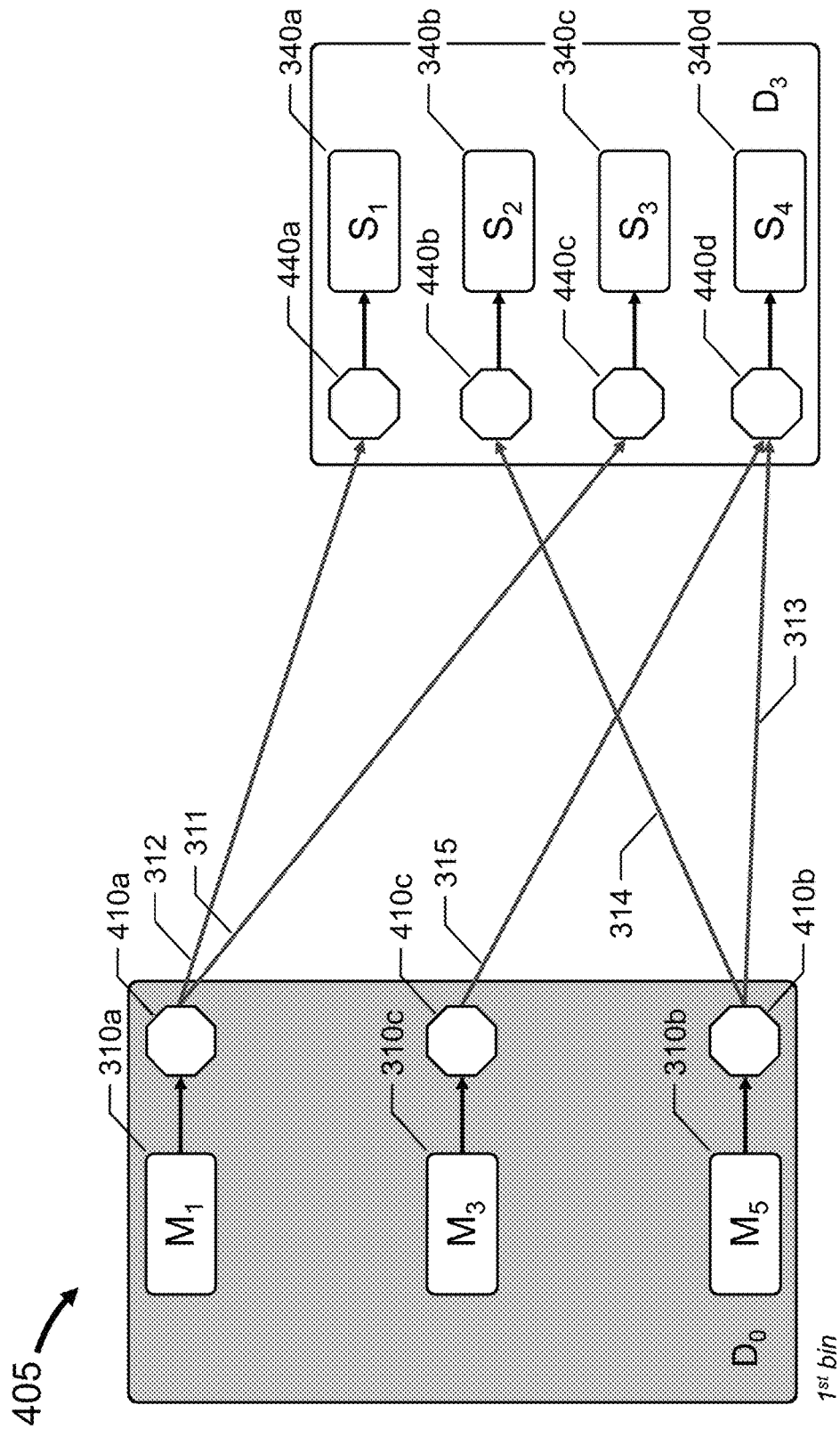
FIGS. 6A, 6B, 6C and 6D present virtual node diagrams for a NoC, in accordance with an embodiment of the present disclosure.

FIG. 6A presents virtual node diagram 405 for NoC 300, in accordance with an embodiment of the present disclosure. Virtual node diagram 405 depicts virtual nodes 410a, 410b and 410c in domain $D_0$ and virtual nodes 440a, 440b, 440c and 440d in domain $D_3$.

Virtual node 410a represents the MNI endpoint for traffic flow sets 311 and 312 at master bridge port 310a ($M_1$), virtual node 410b represents the MNI endpoint for traffic flow sets 313 and 314 at master bridge port 310c ($M_5$), and virtual node 410c represents the MNI endpoint for traffic flow set 315 at master bridge port 310c ($M_3$). Similarly, virtual node 440a represents the ASNI endpoint for traffic flow set 312 at slave bridge port 340a ($S_1$), virtual node 440b represents the ASNI endpoint for traffic flow set 314 at slave bridge port 340b ($S_2$), virtual node 440c represents the ASNI endpoint for traffic flow set 311 at slave bridge port 340c ($S_3$), and virtual node 440d represents the ASNI endpoint for traffic flow sets 313 and 315 at slave bridge port 340d ($S_4$).

Figure 6B:
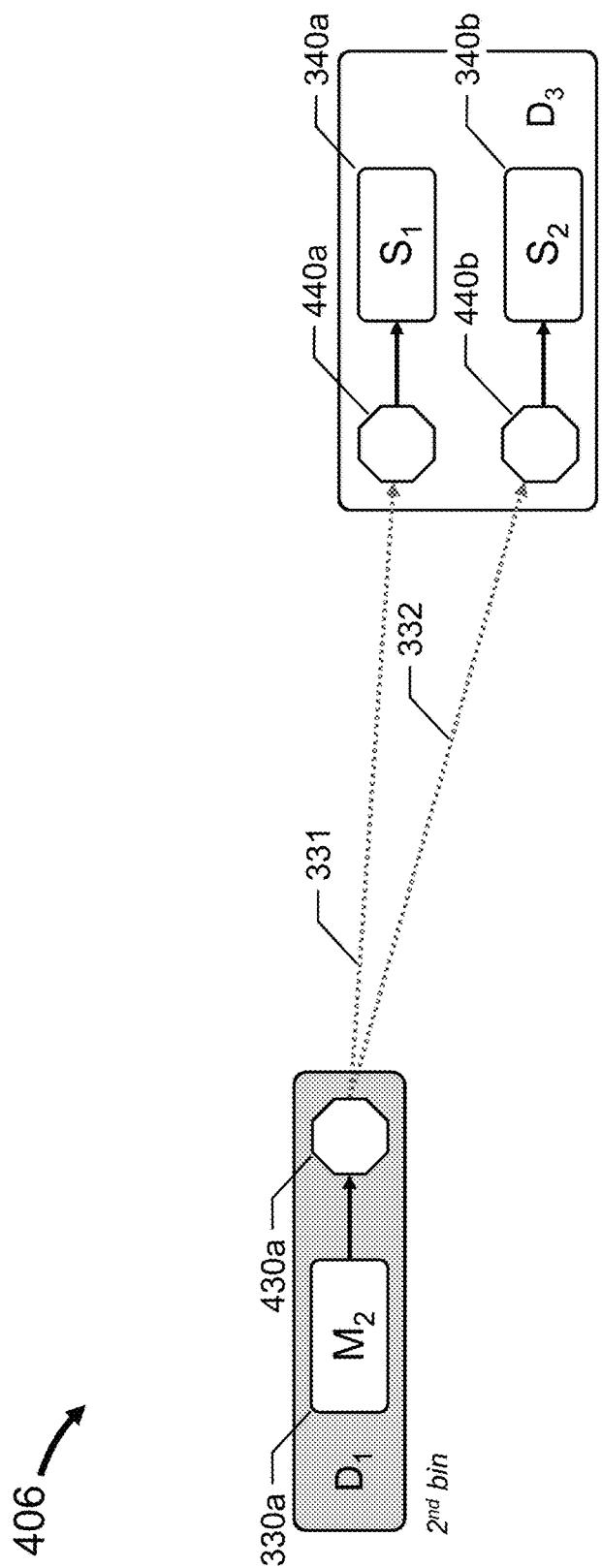

FIG. 6B presents virtual node diagram 406 for NoC 300, in accordance with an embodiment of the present disclosure. Virtual node diagram 406 depicts virtual node 430a in domain $D_1$ and virtual nodes 440a and 440b in domain $D_3$. Virtual node 430a represents the MNI endpoint for traffic flow sets 331 and 332 at master bridge port 310a ($M_2$). Virtual node 440a represents the ASNI endpoint for traffic flow set 331 at slave bridge port 340a ($S_1$), and virtual node 440b represents the ASNI endpoint for traffic flow set 332 at slave bridge port 340b ($S_2$).

Figure 6C:
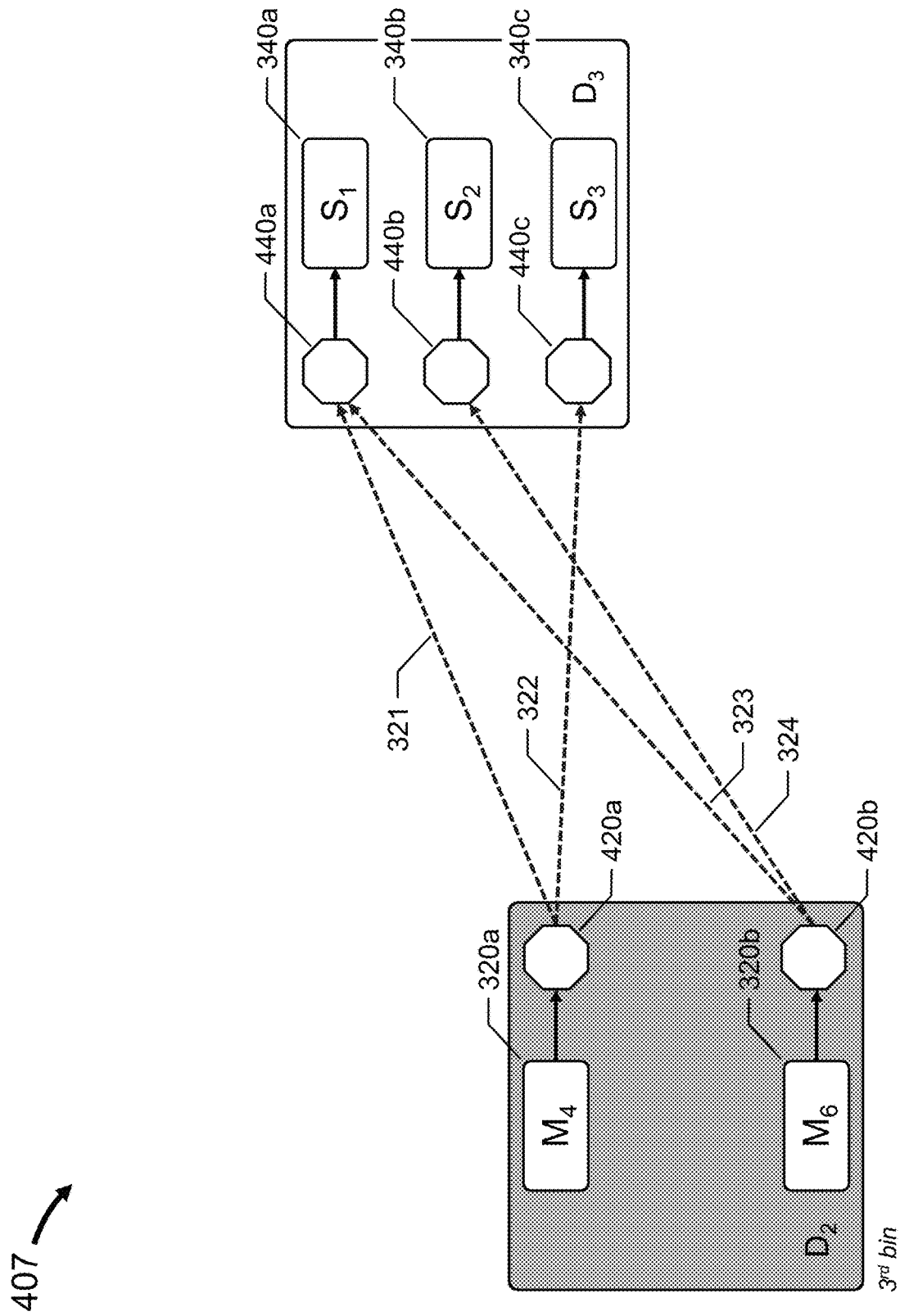

FIG. 6C presents virtual node diagram 407 for NoC 300, in accordance with an embodiment of the present disclosure. Virtual node diagram 4076 depicts virtual nodes 420a and 420b in domain $D_2$ and virtual nodes 440a, 440b and 440c in domain $D_3$. Virtual node 430a represents the MNI endpoint for traffic flow sets 321 and 322 at master bridge port 320a ($M_4$), and virtual node 430a represents the MNI endpoint for traffic flow sets 323 and 324 at master bridge port 320b ($M_6$). Virtual node 440a represents the ASNI endpoint for traffic flow sets 321 and 323 at slave bridge port 340a ($S_1$), virtual node 440b represents the ASNI endpoint for traffic flow set 324 at slave bridge port 340b ($S_2$), and virtual node 440c represents the ASNI endpoint for traffic flow set 322 at slave bridge port 340c ($S_3$).

Figure 6D:
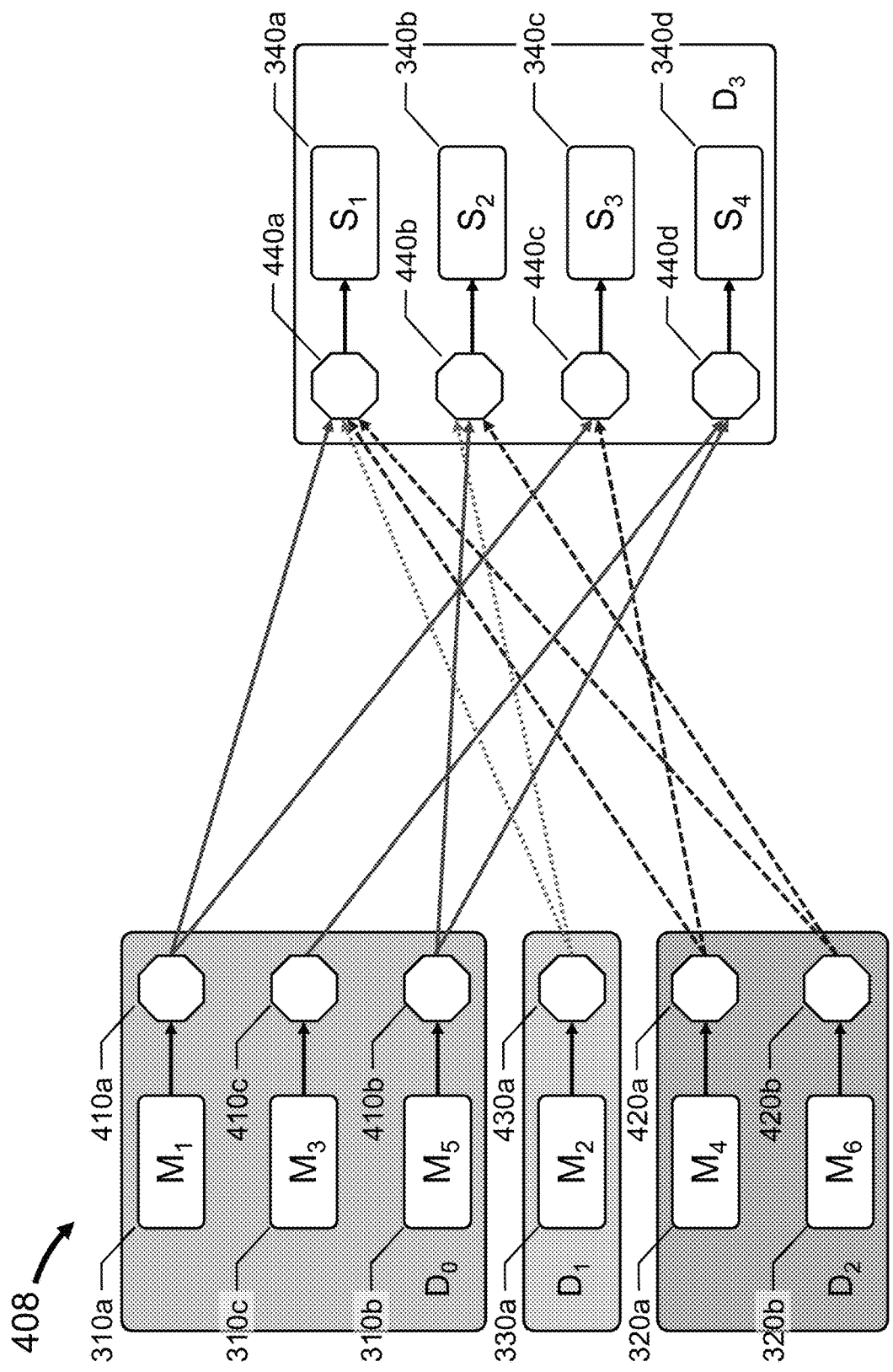

FIG. 6D presents virtual node diagram 407 for NoC 300, which combines virtual node diagrams 404, 405 and 406.

A candidate topology for each bin is generated based on the respective the physical data, the device data, the bridge data, the traffic data, the domain data and the virtual nodes. Each virtual node is expanded into a tree of routers with a native domain assignment to support the required connections. The communicating parallel trees are generated separately where each tree honors the domain crossing constraints.

In one embodiment, the tree is formed from mitosis routers with a native domain assignment. Physical routers have a limitation in terms of the maximum number of ports allowed on any one router. This is to account for the limitations on account of implementation challenges. Typically, the routers are implemented as full N×N multiplexing logic, where N is the number of ports. Since the routers are expected to carry out the switching within one clock cycle, if the switching logic is complicated it can limit the maximum frequency which the router can operate at. To circumvent this port count limitation, the present disclosure introduces the concept of Mitosis routers. These are additional routers added to reach the higher port count, with each router limited to the maximum number of ports supported and any subsequent routers connected to the previous router using one port.

Returning to FIG. 2, at 240, routing is carried out on each tree. In one embodiment, shortest path routing is used, with optional constraints to disallow cycles in the generated topology. Different routing methodologies may be employed, such as, for example, XY-YX routing, turn prohibition routing, etc.

The final topology is then generated by merging the communicating parallel trees which meets the latency, throughput and domain crossing constraints.

Figure 7:
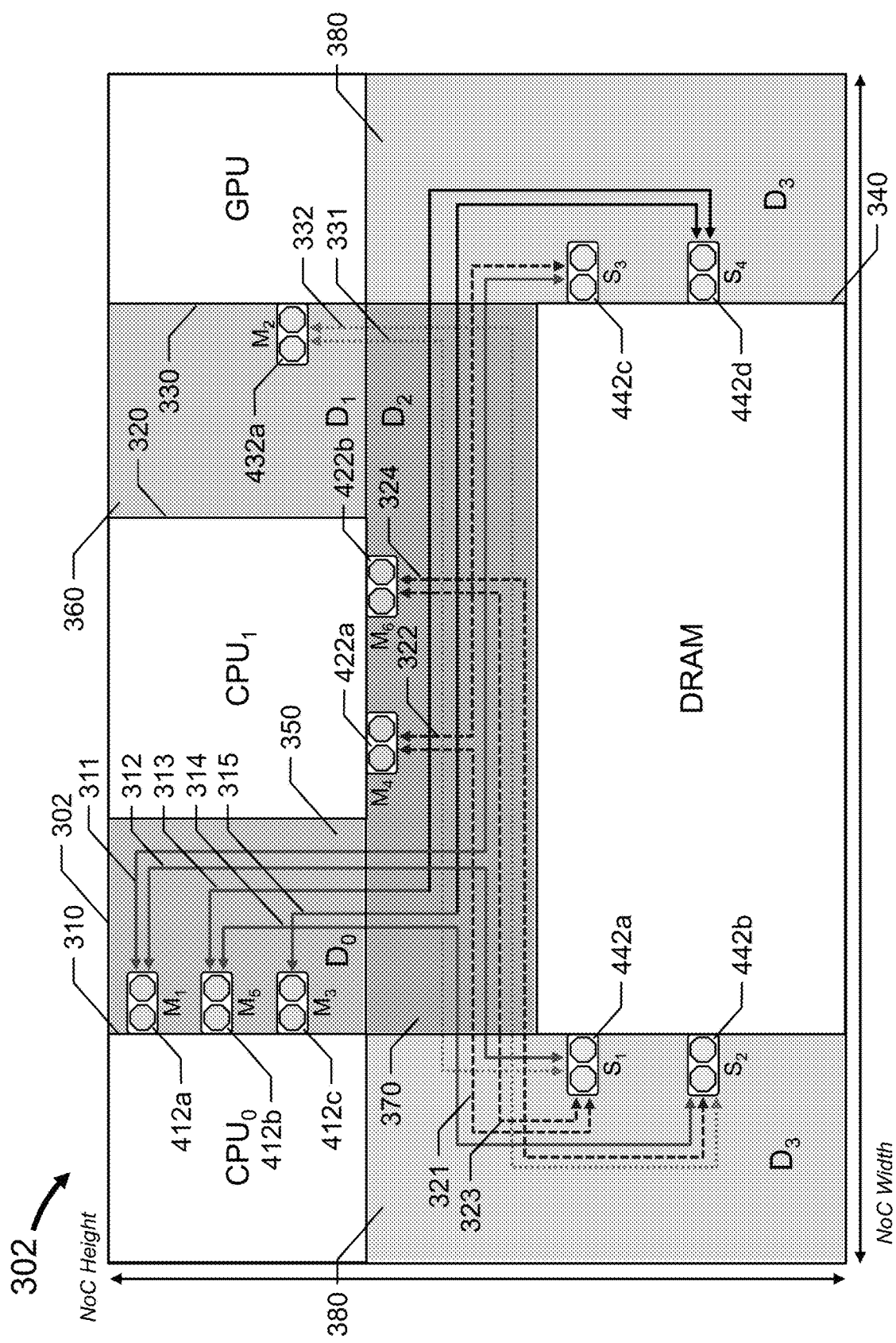
FIG. 7 depicts a NoC final topology, in accordance with an embodiment of the present disclosure.

FIG. 7 depicts NoC 302, in accordance with an embodiment of the present disclosure. NoC 302 is a graphical representation of the NoC final topology, which may be viewed on display 152.

Returning to FIG. 2, at 250, a configuration/debug network is generated. The configuration/debug network includes the bridge ports, routers, routes and connections. In one embodiment, the configuration/debug network mimics the data-network. Additionally, the configuration/debug network may be independently optimized in a manner similar to the data-network. The latency and performance of the configuration/debug network are typically relaxed in order to produce the simplest design with the lowest area.

At 260, a PCDC buffer is added to a connection between a bridge or router in a synchronous clock domain and an adjacent bridge or router in an asynchronous clock domain.

At 270, a link size is determined for each router in each route, and a resizer is added between a bridge and a router with different link sizes or between adjacent routers with different link sizes. Generally, link sizes are determined using bridge data, traffic data, VC assignments and topology in order to collectively meet average traffic performance requirements and to individually meet peak traffic performance requirements. Additionally, the number of resizers added to the NoC is minimized in order to reduce the latency encountered by the traffic flows. In certain embodiments, certain bridge ports may be allowed to peak concurrently.

At 280, pipeline and retiming components are added based on timing. In order to meeting timing, pipeline components are added at appropriate locations to keep the slack (i.e., the difference between a required time and an arrival time) within appropriate limits. For example, one or more components may be relocated, and, if the relocated components are not able to meet timing, then one or more pipeline components may be added. For example, component relocation may be based on force-directed placement, etc.

Figure 8:
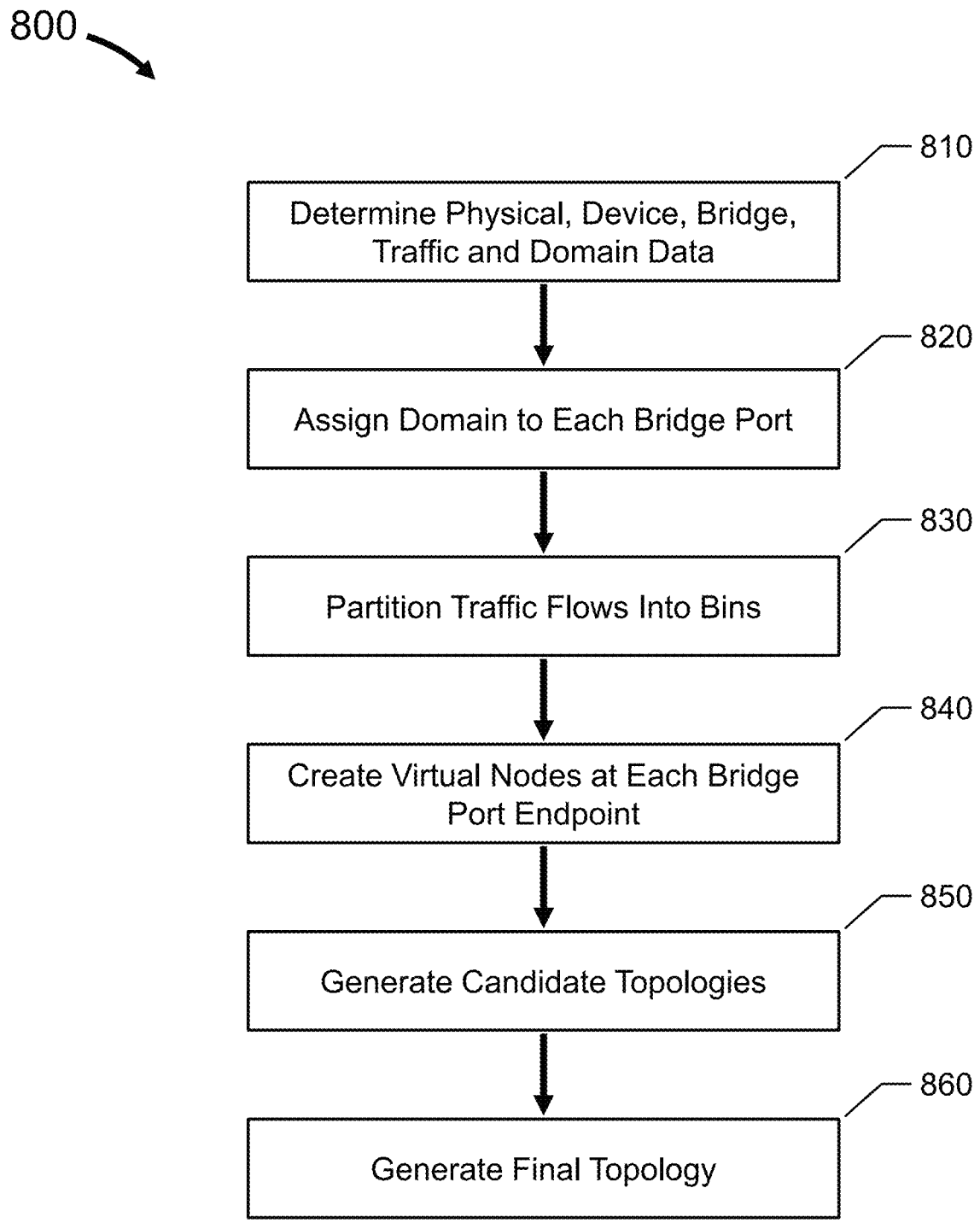
FIG. 8 depicts a flow diagram representing functionality associated with synthesizing a NoC, in accordance with an embodiment of the present disclosure.

FIG. 8 depicts a flow diagram 800 representing functionality associated with synthesizing a NoC, in accordance with embodiments of the present disclosure.

At 810, physical data, device data, bridge data, traffic data and domain data are determined based on an input specification for the NoC. The physical data include dimensions for the NoC, the device data include a plurality of devices, each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints.

At 820, a domain is assigned to each bridge port.

At 830, each traffic flow is partitioned into one of a plurality of bins based on the bridge port domain assignments and the domain crossing constraints.

At 840, a virtual node is created at each bridge port endpoint.

At 850, a candidate topology is generated for each bin based on the physical data, the device data, the bridge data, the traffic data, the domain data and the virtual nodes. Each candidate topology includes bridge ports, a tree of routers, routes and connections.

At 860, a final topology is generated by merging the candidate topologies.

Embodiments of the present disclosure advantageously provide a computer-based method and system for synthesizing a Network-on-Chip (NoC). The embodiments described above and summarized below are combinable.

In one embodiment, a computer-based method for generating a Network-on-Chip (NoC) topology includes determining physical data, device data, bridge data, traffic data and domain data based on an input specification for the NoC; assigning a domain to each bridge port; partitioning each traffic flow into one of a plurality of bins based on the bridge port domain assignments and the domain crossing constraints; creating a virtual node at each bridge port endpoint; generating a candidate topology for each bin based on the physical data, the device data, the bridge data, the traffic data, the domain data and the virtual nodes, each candidate topology including bridge ports, a tree of routers, routes and connections; and generating a final topology by merging the candidate topologies. The physical data include dimensions for the NoC, the device data include a plurality of devices, each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints.

In another embodiment of the method, generating a candidate topology for each bin includes expanding each virtual node into a tree of mitosis routers with a native domain assignment.

In another embodiment of the method, generating a final topology includes merging the trees of mitosis routers from the candidate topologies.

In another embodiment of the method, the domain data includes at least one of voltage domain data, power domain data and clock domain data.

In another embodiment of the method, the domain crossing constraint includes crossing at least one domain for each route.

In another embodiment of the method, the domain data includes power domain data and clock domain data.

In another embodiment of the method, the final topology satisfies the domain crossing constraints.

In another embodiment, a system includes a processor configured to generate a Network-on-Chip (NoC) topology including determine physical data, device data, bridge data, traffic data and domain data based on an input specification for the NoC, assign a domain to each bridge port; partitioning each traffic flow into one of a plurality of bins based on the bridge port domain assignments and the domain crossing constraints; create a virtual node at each bridge port endpoint; generate a candidate topology for each bin based on the physical data, the device data, the bridge data, the traffic data, the domain data and the virtual nodes, each candidate topology including bridge ports, a tree of routers, routes and connections; and generate a final topology by merging the candidate topologies. The physical data include dimensions for the NoC, the device data include a plurality of devices, each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints.

In another embodiment of the system, generate a candidate topology for each bin includes expand each virtual node into a tree of mitosis routers with a native domain assignment.

In another embodiment of the system, generate a final topology includes merge the trees of mitosis routers from the candidate topologies.

In another embodiment of the system, the domain data includes at least one of voltage domain data, power domain data and clock domain data.

In another embodiment of the system, the domain crossing constraint includes crossing at least one domain for each route.

In another embodiment of the system, the domain data includes power domain data and clock domain data.

In another embodiment of the system, the final topology satisfies the domain crossing constraints.

In another embodiment, a non-transient computer-readable medium storing instructions that, when executed by a processor, cause the processor to generate a Network-on-Chip (NoC) topology, the instructions including determining physical data, device data, bridge data, traffic data and domain data based on an input specification for the NoC; assigning a domain to each bridge port; partitioning each traffic flow into one of a plurality of bins based on the bridge port domain assignments and the domain crossing constraints; creating a virtual node at each bridge port endpoint; generating a candidate topology for each bin based on the physical data, the device data, the bridge data, the traffic data, the domain data and the virtual nodes, each candidate topology including bridge ports, a tree of routers, routes and connections; and generating a final topology by merging the candidate topologies. The physical data include dimensions for the NoC, the device data include a plurality of devices, each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints.

In another embodiment of the non-transient computer-readable medium, generating a candidate topology for each bin includes expanding each virtual node into a tree of mitosis routers with a native domain assignment.

In another embodiment of the non-transient computer-readable medium, generating a final topology includes merging the trees of mitosis routers from the candidate topologies.

In another embodiment of the non-transient computer-readable medium, the domain data includes at least one of voltage domain data, power domain data and clock domain data.

In another embodiment of the non-transient computer-readable medium, the domain crossing constraint includes crossing at least one domain for each route.

In another embodiment of the non-transient computer-readable medium, the domain data includes power domain data and clock domain data.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments.

No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for generating a Network-on-Chip (NoC) topology, comprising:
    determining physical data, device data, bridge data, traffic data and domain data based on an input specification for the NoC, where the physical data include dimensions for the NoC, the device data include a plurality of devices and each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints;
    assigning a domain to each bridge port;
    partitioning each traffic flow into one of a plurality of bins based on the bridge port domain assignments and the domain crossing constraints;
    creating a virtual node at each bridge port endpoint;
    generating a candidate topology for each bin based on the physical data, the device data, the bridge data, the traffic data, the domain data and the virtual nodes, each candidate topology including bridge ports, a tree of routers, routes and connections; and
    generating a final topology by merging the candidate topologies.

2. The computer-based method according to claim 1, where said generating a candidate topology for each bin includes expanding each virtual node into a tree of mitosis routers with a native domain assignment.

3. The computer-based method according to claim 2, where said generating a final topology includes merging the trees of mitosis routers from the candidate topologies.

4. The computer-based method according to claim 1, where the domain data includes at least one of voltage domain data, power domain data and clock domain data.

5. The computer-based method according to claim 4, where the domain crossing constraint includes crossing at least one domain for each route.

6. The computer-based method according to claim 5, where the domain data includes power domain data and clock domain data.

7. The computer-based method according to claim 1, where the final topology satisfies the domain crossing constraints.

8. A system, comprising:
    a processor configured to generate a Network-on-Chip (NoC) topology including:
        determine physical data, device data, bridge data, traffic data and domain data based on an input specification for the NoC, where the physical data include dimensions for the NoC, the device data include a plurality of devices and each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints;
        assign a domain to each bridge port;
        partitioning each traffic flow into one of a plurality of bins based on the bridge port domain assignments and the domain crossing constraints;
        create a virtual node at each bridge port endpoint;
        generate a candidate topology for each bin based on the physical data, the device data, the bridge data, the traffic data, the domain data and the virtual nodes, each candidate topology including bridge ports, a tree of routers, routes and connections; and
        generate a final topology by merging the candidate topologies.

9. The system according to claim 8, where said generate a candidate topology for each bin includes expand each virtual node into a tree of mitosis routers with a native domain assignment.

10. The system according to claim 9, where said generate a final topology includes merge the trees of mitosis routers from the candidate topologies.

11. The system according to claim 8, where the domain data includes at least one of voltage domain data, power domain data and clock domain data.

12. The system according to claim 11, where the domain crossing constraint includes crossing at least one domain for each route.

13. The system according to claim 12, where the domain data includes power domain data and clock domain data.

14. The system according to claim 8, where the final topology satisfies the domain crossing constraints.

15. A non-transient computer-readable medium storing instructions that, when executed by a processor, cause the processor to generate a Network-on-Chip (NoC) topology, the instructions comprising:
    determining physical data, device data, bridge data, traffic data and domain data based on an input specification for the NoC, where the physical data include dimensions for the NoC, the device data include a plurality of devices and each device has a location and dimensions, the bridge data include a plurality of bridge ports, each bridge port has a location and each bridge port is associated with one of the devices, the traffic data include a plurality of traffic flows and each traffic flow is associated with a set of bridge port endpoints, and the domain data include a plurality of domains and one or more domain crossing constraints;

assigning a domain to each bridge port;

partitioning each traffic flow into one of a plurality of bins based on the bridge port domain assignments and the domain crossing constraints;

creating a virtual node at each bridge port endpoint;

generating a candidate topology for each bin based on the physical data, the device data, the bridge data, the traffic data, the domain data and the virtual nodes, each candidate topology including bridge ports, a tree of routers, routes and connections; and generating a final topology by merging the candidate topologies.

16. The non-transient computer-readable medium according to claim 15, where said generating a candidate topology for each bin includes expanding each virtual node into a tree of mitosis routers with a native domain assignment.

17. The non-transient computer-readable medium according to claim 16, where said generating a final topology includes merging the trees of mitosis routers from the candidate topologies.

18. The non-transient computer-readable medium according to claim 15, where the domain data includes at least one of voltage domain data, power domain data and clock domain data.

19. The non-transient computer-readable medium according to claim 18, where the domain crossing constraint includes crossing at least one domain for each route.

20. The non-transient computer-readable medium according to claim 19, where the domain data includes power domain data and clock domain data.

* * * * *